United States Patent
Gandhi et al.

(10) Patent No.: US 11,403,093 B1
(45) Date of Patent: Aug. 2, 2022

(54) APPLICATION MODIFICATION WITH PROXY SERVICE PROCESS

(71) Applicant: Oracle International Corporation, Redwood Shores, CA (US)

(72) Inventors: Nirav Gandhi, Lexington, MA (US); Chaitanya Umesh Kulkarni, Wohurn, MA (US); Drupad Mahendra Panchal, Lexington, MA (US); Jonathan Fredericks Soule, Nashua, NH (US); Jonathan David Klein, Merrimack, NH (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/243,050

(22) Filed: Apr. 28, 2021

(51) Int. Cl.
*G06F 9/44* (2018.01)
*G06F 8/656* (2018.01)
*G06F 9/445* (2018.01)
*H04L 67/561* (2022.01)
*G06F 11/34* (2006.01)
*G06F 11/30* (2006.01)

(52) U.S. Cl.
CPC .......... *G06F 8/656* (2018.02); *G06F 9/44594* (2013.01); *G06F 11/302* (2013.01); *G06F 11/3495* (2013.01); *H04L 67/2804* (2013.01)

(58) Field of Classification Search
None
See application file for complete search history.

(56) References Cited

U.S. PATENT DOCUMENTS

| | | | |
|---|---|---|---|
| 10,042,628 B2* | 8/2018 | OlmstedThompson | H04L 67/34 |
| 10,866,952 B2* | 12/2020 | Nixon | G06F 16/256 |
| 10,871,953 B2* | 12/2020 | Wei | G06F 8/65 |
| 11,249,647 B2* | 2/2022 | Mummidi | G06F 13/4004 |
| 2018/0081676 A1* | 3/2018 | Lindholm | G06F 8/656 |
| 2019/0384651 A1* | 12/2019 | Newburn | G06F 9/54 |
| 2022/0043650 A1* | 2/2022 | Jain | G06F 11/3664 |

* cited by examiner

Primary Examiner — Anna C Deng
(74) Attorney, Agent, or Firm — Invoke (57) ABSTRACT

Techniques for updating an application using a non-servicing state are disclosed. One or more embodiments include executing an application, in a state which does not provide services, to avoid the application being restarted by a watchdog process. The non-servicing state may not perform any function other than to continue executing at least one proxy service process which avoids the application being restarted by a watchdog process. Responsive to determining that the application process is executing, the watchdog process does not detect any issue with the application, and therefore does not restart the application. The watchdog process may verify the continuing execution of the application process by, for example, determining that the application process is included in a list of executing processes managed by an operating system. The watchdog process may verify the continuing execution of the application process by, for example, communicating with the application process.

20 Claims, 7 Drawing Sheets

APPLICATION MODIFICATION WITH PROXY SERVICE PROCESS

TECHNICAL FIELD

The present disclosure relates to modifying an application using a proxy process that does not provide the services normally provided by the application. In particular, the present disclosure relates to running a proxy process while updating an application to monitor the update process and to avoid the need to shut down the application during the update.

BACKGROUND

Applications running on computer systems frequently require updates to implement changes to security policies or to modify application functionality. The application may need to be shut down during the update process to give the application time to configure files without having processes access the files prior to completion of the update. At the same time, computer operating systems include watchdog processes that monitor applications running on the operating system to ensure the applications run without interruption. When a watchdog detects an application shut-down, the watchdog may restart the application. If a system watchdog process restarts an application that is being configured for an update, the application files or state information being modified in the updated may be corrupted when the application is re-started prior to completion of the update.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. APPLICATION UPDATE WITH PROXY SERVICE PROCESS
4. EXAMPLE EMBODIMENT
5. COMPUTER NETWORKS AND CLOUD NETWORKS
6. MISCELLANEOUS; EXTENSIONS
7. HARDWARE OVERVIEW

1. General Overview

Watchdog processes monitor applications to ensure the applications remain running. When a watchdog process detects an application has shut down, the watchdog process initiates a restart of the application. However, restarting an application during an update to application state information may corrupt files used by the application.

One or more embodiments include executing an application, in a state which does not provide services ("non-servicing state"), to avoid the application being restarted by a watchdog process. The non-servicing state may not perform any function other than to continue executing at least one application process which avoids the application being restarted by a watchdog process. Responsive to determining that the application process is executing, the watchdog process does not detect any issue with the application, and therefore does not restart the application. The watchdog process may verify the continuing execution of the application process by, for example, determining that the application process is included in a list of executing processes managed by an operating system. The watchdog process may verify the continuing execution of the application process by, for example, communicating with the application process.

One or more embodiments execute the application in a non-servicing state during a period of time when updates are being made to application state information. The updates may be performed by an independently executing process or application that does not in any way require the application be executing in the non-servicing state. An application process, executing in the non-servicing state, may (a) initiate an independently executing update process (that is part of the same application or a separate application) and (b) continue to execute until the update process is completed to avoid a restart by the watchdog process. Once the update has been completed, the application may switch from operating in the non-servicing state in which no services are provided to a servicing state in which services are provided by the application. In an example, switching may involve terminating execution of the application, and restarting by the watchdog process. Upon restart, the application executes a primary process that provides the services.

One or more embodiments described in this Specification and/or recited in the claims may not be included in this General Overview section.

2. Architectural Overview

Figure 1:
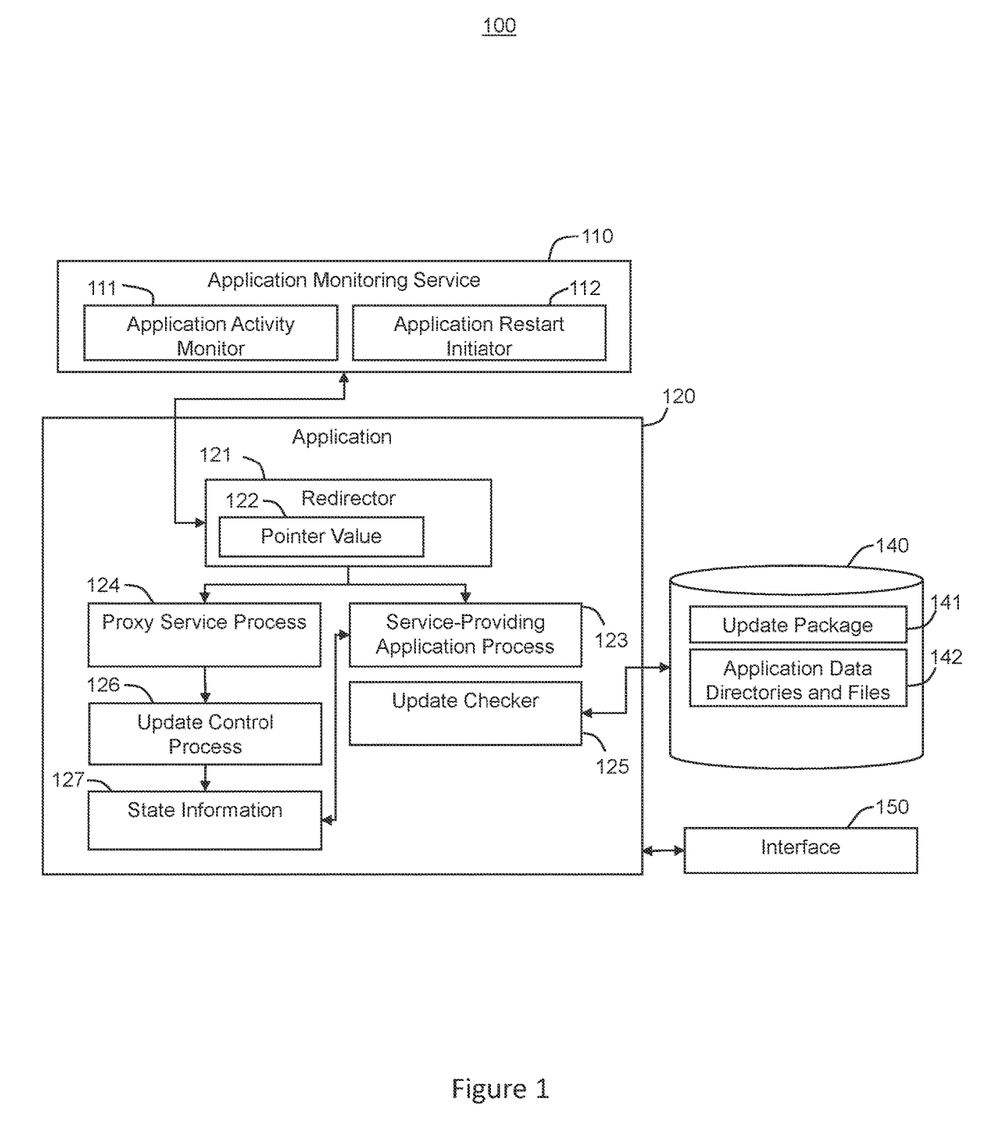
FIG. 1 illustrates a system in accordance with one or more embodiments.

FIG. 1 illustrates a system 100 in accordance with one or more embodiments. As illustrated in FIG. 1, system 100 includes an application monitoring service 110, an application 120, and a data repository 140. The application monitoring service 110 includes a process activity monitor 111 and an application restart initiator 112. The application monitoring service 110 may be a watchdog of an operating system. For example, the application monitoring service 110 may be a Linux™ or Windows™ OS process configured to monitor one or more applications running on the OS. The application monitoring service 110 may initiate an application process and ensure the initiated process is executing. The application monitoring service 110 may, for example, obtain an identifier for the initiated process. The application monitoring service 110 may then ensure the identifier is included in a list of executing processes managed by the system. The application activity monitor 111 may monitor applications actively or passively. Active monitoring may include sending a ping to a monitored application at regular intervals or when an event, such as a start-up is detected. The application activity monitor 111 determines that an application 120 is active based on receiving a reply. Passive monitoring may include receiving a ping at regular intervals or within predetermined time periods, without first sending a request ping. Upon failing to receive a ping from an application 120 at an expected time, the process activity monitor may ping the application to determine whether the application 120 is active or may automatically initiate a restart of the application 120. In one embodiment, the application 120 indicates it is active by transmitting a process ID of the application, or one or more processes of the application 120, to the application activity monitor 111. Upon determining that a monitored application 120 has stopped running, the restart initiator 112 sends a signal to a control process, or parent process, of an application 120 to start up the application.

The application 120 includes a redirector 121 that launches a version of the application 120 and interfaces with the application monitoring service 110. The redirector 121 launches the application 120 by launching software located at a location in memory associated with the pointer value 122. The location in memory corresponds to either the service-providing application process 123 or to the non-service-providing proxy service process 122.

An update checker 125 checks a data repository 140 to determine whether an update is available for the application 120.

The redirector 121 manages interaction between the application monitoring service 110 and the application 120. When the application activity monitor 111 determines that a process of the application 120 has stopped, the redirector 121 receives an instruction from the application restart initiator 112 to restart the process. The redirector 121 launches the process by executing the program pointed to by the pointer value 122. For example, when the pointer value 122 points to a program corresponding to the service-providing application process 123, the redirector 121 launches the service-providing application process 123.

For example, the application may be a data monitoring application having a service-providing application process that includes a service of analyzing data and another service of generating a visual display of the data analysis. As another example, the application may be a human resources application including processes that provide services for entering and storing employee information and generating reports. While examples are provided above, embodiments of the invention encompass any type of application, application process, and application service. A user may interface with the application 120 via an interface 150 to cause the application to perform the application process 123 to provide the application service.

In one or more embodiments, interface 150 refers to hardware and/or software configured to facilitate communications between a user and the application 120. Interface 150 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 150 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 150 is specified in one or more other languages, such as Java, C, or C++.

The application 120 includes an update checker 125. While the application 120 is running, the update checker 125 checks the data repository 140 to determine whether an update exists for the application 120. The update checker 125 may perform a check at a predetermined time interval, such as weekly, or at any other time. For example, the application 120 may be configured to check for updates upon startup of the application 120 or upon shut-down of the application 120. The data repository 140 may be an update server. The update server may store update packages 141. An update package may include state data and software to update an application from one version to an updated version. The updated version may include the same application processes and services, or different application processes and services.

In one or more embodiments, a data repository 140 is any type of storage unit and/or device (e.g., a file system, database, collection of tables, or any other storage mechanism) for storing data. Further, a data repository 104 may include multiple different storage units and/or devices. The multiple different storage units and/or devices may or may not be of the same type or located at the same physical site. Further, a data repository 140 may be implemented or may execute on the same computing system as the application monitoring service 110 or the application 120. Alternatively, or additionally, a data repository 140 may be implemented or executed on a computing system separate from the application monitoring service 110 or the application 120. A data repository 104 may be communicatively coupled to the application monitoring service 110 or the application 120 via a direct connection or via a network.

Information describing the update package 141 and the application data directories and files 142 may be implemented across any of components within the system 100. However, this information is illustrated within the data repository 140 for purposes of clarity and explanation.

Upon determining that an update exists, the update checker 125 downloads the update package 141. The update checker 125 prepares the application 120 for the update. In one embodiment, the update package is a compressed file. The update control process unzips the compressed file, and stores state information and file information corresponding to an updated application version. The update checker 125 may further prepare for an update by checking, confirming, or modifying state information 127 or data stored in data files 142 required for the update to be completed.

Upon completing preparation for the update, the update checker 125 changes a value of the pointer value 122 to point to the proxy service process 124 and shuts itself down. The pointer value 122 associated with the proxy service process 124 results in the redirector 121 launching the proxy service process. The application monitoring service 110 may detect that the application has shut down and may restart the application 120. For example, the application monitoring service 110 may cause an OS API to restart the application 120. Upon launching the application, the redirector 121 is the first process to be launched. The redirector 121 determines which additional processes to launch. In particular, the redirector 121 launches the application process indicated by the pointer value 122. Since the pointer value 122 has been set to the proxy service process 124, the redirector 121 launches the proxy service process 124.

The proxy service process 124 is a process that initiates an update process of the application 120 and may monitor the update process for success or failure. The proxy does not run application processes that provide application services. However, while the proxy service process 124 is running, the application 120 is kept running. Consequently, the application 120 is included in a list of running processes maintained by the OS. Alternatively, while the proxy service process 124 is running, the redirector 121 may transmit regularly-scheduled pings to the application activity monitor 111 indicating the application 120 is active. Alternatively, the redirector 121 may respond to queries from the application activity monitor 111 with responses indicating the application 120 is active. Consequently, the application restart initiator 112 does not attempt to restart the application 120 during the update process.

The proxy service process 124 launches the update control process 126 of the application 120 to complete the update process. The proxy service process 124 may or may not monitor the update process to determine whether the process is successful. The update control process 126 performs the update to the application 120 by writing or modifying state information 127 and application data directories and files 142. While the update control process 126 updates the state information 127 and application data directories and files 142, the redirector 121 does not initiate messages to, or receive messages from, the update control process 126. The update control process 126 is an orphaned process that executes independently of, and without supervision of, the redirector 121. In one or more alternative embodiments, the process that performs the update of the application 120 may be a process of a different application or a process of the OS.

The update control process 126 may be configured to transmit a file marker or other notification to the proxy service process 124 upon completion of writing and editing state information and files for the update. Alternatively, the proxy service process 124 may be programmed to indicate the update is completed after a pre-defined period of time. Upon determining that the update is complete, the proxy service process 124 sets the pointer value 122 to the service-providing application process 123 and shuts itself down. By resetting the pointer value 122 to the location associated with the service-providing application process 123, the proxy service process 124 prepares the application 120 to launch the updated version of the application 120.

The application activity monitor 111 determines that the application 120 has been shut down and restarts the application. For example, the application restart initiator 112 may be an OS API that restarts the application 120. The redirector 121 is launched prior to other processes of the application that provide services and prior to the proxy service process 124. Since the proxy service process 124 set the pointer value 122 to a location corresponding to the service-providing application process 123, redirector 121 launches the application 120 from the location pointed to by the pointer value 122 to thereby launch the updated version of the application 120 and not the proxy service process 124.

As described above, the application 120 may have a servicing configuration, embodied by the service-providing application process 123 in which the application 120 provides one or more application services. The application may also include a non-servicing configuration, embodied in the proxy service process 124. While the application 120 is running the proxy service process 124, the application 120 does not provide services to any other applications or users. Instead, the proxy service process 124 may monitor the updating of state information and data files for success or failure of the update process prior to running an updated version of the application 120.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 5, titled "Computer Networks and Cloud Networks."

In one or more embodiments, the application monitoring service 110 refers to hardware and/or software configured to perform operations described herein for monitoring one or more applications. Examples of operations for updating an application with a proxy service process are described below with reference to FIGS. 2A and 2B.

In an embodiment, the application monitoring service 110 and the application 120 are implemented on one or more digital devices. The application 120 interfaces with components of the digital device to provide one or more services, such as audio, video, data processing, etc. to one or more users or other applications. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Application Upgrade with Proxy Service Process

Figure 2A:
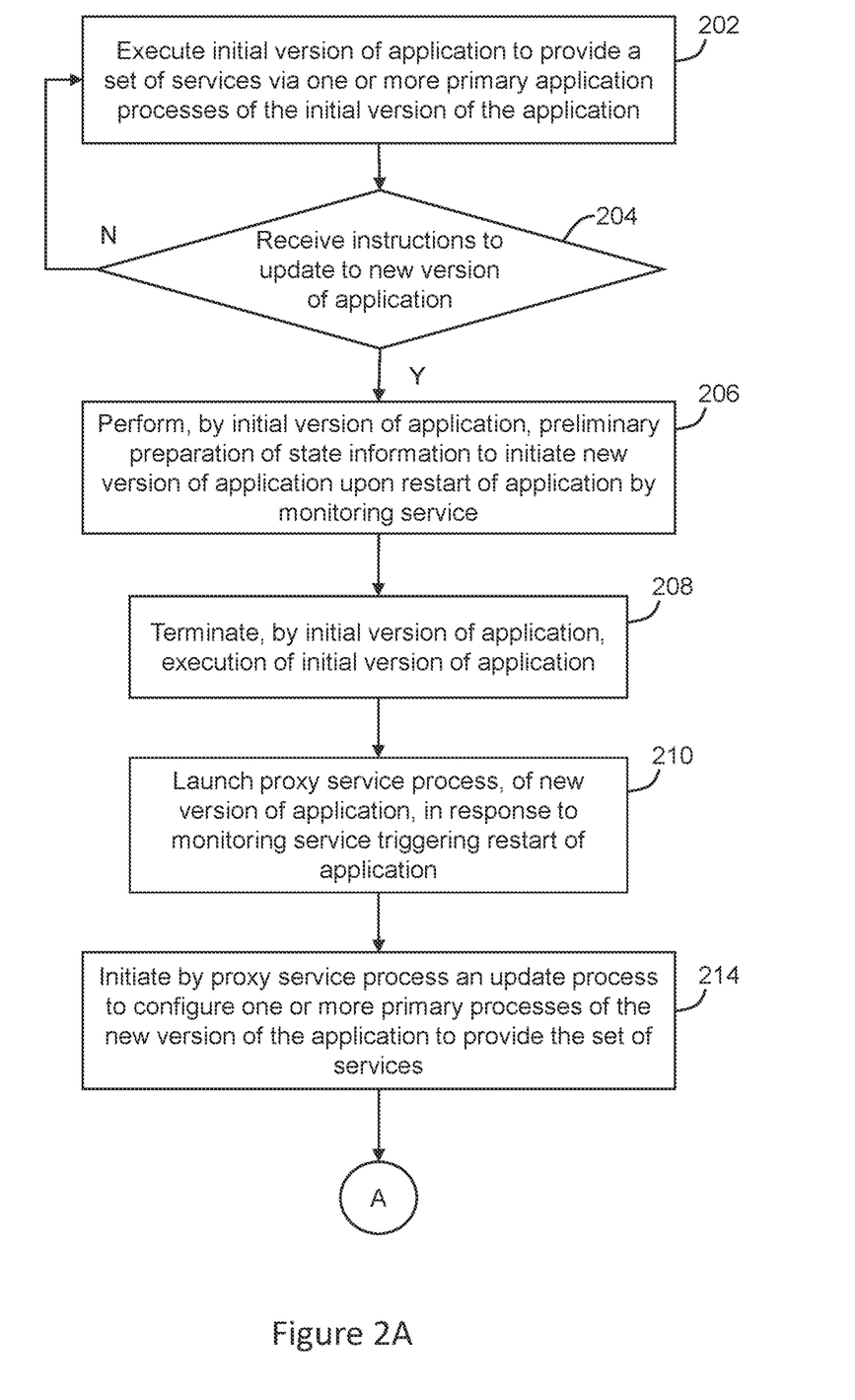
FIGS. 2A and 2B illustrate an example set of operations for updating an application with a proxy service process in accordance with one or more embodiments.
Figure 2B:
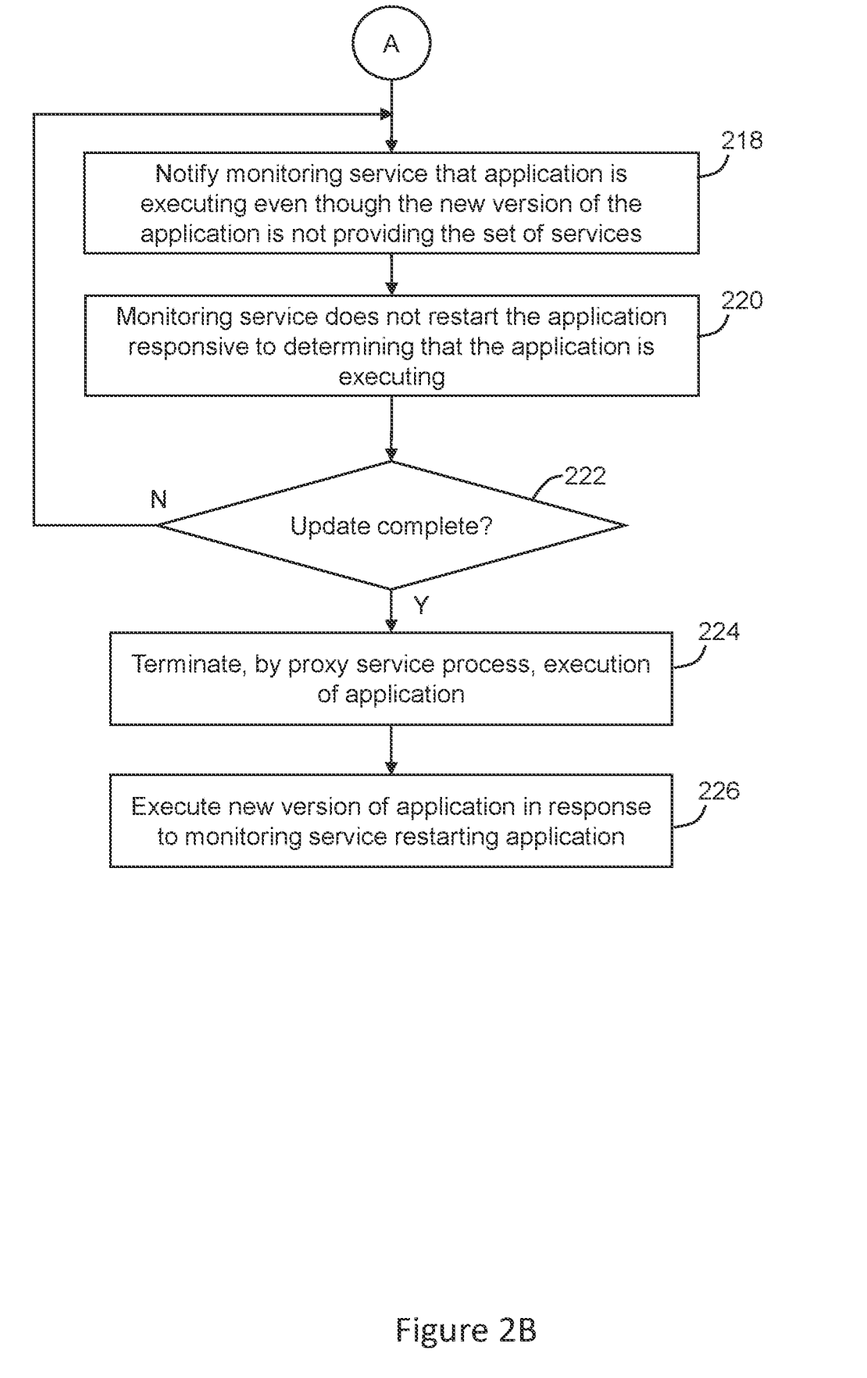

FIGS. 2A and 2B illustrate an example set of operations for upgrading an application with a proxy service process in accordance with one or more embodiments. One or more operations illustrated in FIGS. 2A and 2B may be modified, rearranged, or omitted all together. Accordingly, the particular sequence of operations illustrated in FIGS. 2A and 2B should not be construed as limiting the scope of one or more embodiments.

A system executes an initial version of an application that provides a set of services via one or more processes of the initial version of the application (Operation 202). For example, the application may be a video communication application having an application process that includes a service of receiving streaming video data and another service of generating streaming video data.

The system determines whether instructions have been received to update the application to a new version (Operation 204). In one embodiment, an application update server sends a notification to the system executing the application when an update is ready for the application. Alternatively, the system may query the application server or other data storage to determine whether update data exists to update the application.

Upon determining that instructions have been received to update the application, the initial version of the application performs a preliminary preparation of state information, data files, and directories (Operation 206). For example, a preliminary preparation may include ensuring particular registers include particular values, ensuring particular data files or directories exist, or have particular values. Performing the preliminary preparation also includes setting a pointer value for initiating the application to a location pointing to a proxy service process that does not provide the application services. In one embodiment, the proxy service process is part of the updated version of the application. In another embodiment, the proxy application service is separate from the updated version of the application.

The initial version of the application terminates itself (Operation 208). The termination of the application causes the monitoring service to recognize the application as being inactive. The monitoring service generates an instruction to restart the application. For example, an OS API may restart the application responsive to the instruction from the monitoring service. Upon restarting the application, the redirector may be launched. The redirector determines which application processes to launch.

The redirector launches the proxy service process in response to receiving the instruction to restart the application (Operation 210). In particular, the redirector looks to the pointer value to determine a location in memory to find the program to launch the application. Since the initial version of the application changed the pointer value to a value corresponding to the proxy service process, the redirector launches the proxy service process. The proxy service process may be a component of the new version of the application that initiates and monitors updating the new version of the application.

The proxy service process initiates the update process of the new version of the application (Operation 214). The update process configures one or more processes of the new version to provide the set of services previously provided by the initial version. The proxy service process does not execute application processes that provide services. For example, in an embodiment in which the application is a video communication application, the proxy service process does not execute application processes to receive or transmit streaming video data. Instead, the proxy service process initiates and monitors the update process. In addition, during the update process, no other processes of the new version of the application provide the set of services.

In one or more embodiments, the update process modifies state data of the application and modifies data files and data directories including the computer program that, when executed, performs the processes of the application for providing the set of services. The set of services of the new version of the application may be the same set of services as the initial version of the application. Alternatively, the set of services provided by the new application may differ from the set of services provided by the initial application. For example, in an embodiment in which the application is a video communication application, the update may include the same services—receiving and transmitting streaming video—but the update may improve data transmission characteristics, video rendering, or other characteristics of the video transmission. Alternatively, the services provided by the new version of the application may include different services, such as allowing for additional participants to video communications, providing transcriptions of video communications, or allowing for real-time video filters.

In one embodiment, the proxy service process initiates the update process by de-compressing a compressed data file. The compressed data file may be an executable file that is executed by the proxy service process. The new version of the application may update itself without any communication with the redirector. For example, the new version of the application may refrain from transmitting any notifications to the redirector. In addition, since the redirector was configured to launch the proxy service process, not the application processes of the new version of the application, the redirector does not transmit any messages to the updating new version of the application while the update is occurring. Instead, the updating process of the application is orphaned, or detached from any communication with the redirector. During the update, the proxy service process does not access state information associated with the new version of the application or data files or directories storing the computer program that, when executed, performs the operations to provide the set of services.

The redirector notifies the monitoring service that the application is active, even though the updating new version of the application does not provide the set of services (Operation 218). In particular, the redirector generates the notification that the application is active based only on the active state of the proxy service process. The redirector does not determine whether the new version of the application is providing the set of services. Nor is the redirector aware of the new version of the application updating itself. The redirector does not look to the updating state information or updating data files or directories to determine whether the application is active.

In one or more embodiments, a trigger may be detected to notify the monitoring service of the active status of the application. The trigger may be initiated by the monitoring service by pinging the application at regular intervals, for example. Alternatively, the trigger may be initiated by the redirector by transmitting a status to the monitoring service at regular intervals.

Upon receiving the confirmation that the application remains active, the monitoring service does not generate an instruction to restart the application (Operation 220). In particular, the monitoring service only receives the indicator from the redirector, based on the active status of the proxy service process, that the application is active. The monitoring service does not base its determination of the active status of the application on whether the new version of the application is providing the set of services.

The proxy service process determines whether the update is complete (Operation 222). In one embodiment, the proxy service process receives from the application update process a file marker signaling the completed update. Alternatively, the proxy service process may determine that a pre-defined period of time has elapsed since the beginning of the update process. The proxy service process may determine based on the elapsed time that the update is complete.

Upon determining that the update is complete, the proxy service process terminates the application (Operation 224). Prior to terminating the application, the proxy service process sets a pointer value accessed by the redirector to a location corresponding to an application process of the new version of the application that provides the set of services, instead of to a location corresponding to the proxy service process. Upon detecting that the application is no longer active, the monitoring service generates an instruction to restart the application. In one or more alternative embodiments, the redirector may launch the service-providing application process without the proxy service process shutting down the application. Once the service-providing application process is launched, the proxy service process may stop running.

Upon receiving the instruction to restart the application, the redirector launches the new version of the application by executing the computer program located at a location in memory pointed to by the pointer value (Operation 226). The updated new version of the application provides the set of services. For example, in the embodiment in which the application is a video communication application, the updated new version of the application provides the video communication services, including transmitting and receiving streaming video data. The updated new version of the application may additionally include application processes that provide different services than the initial version of the application.

The embodiments described in FIGS. 2A and 2B describe a system in which an application may be executed in a servicing configuration and a non-servicing configuration. In the servicing configuration, the application provides a set of services by executing a set of processes. In the non-servicing configuration, the application does not provide the set of services. In the embodiment described in FIGS. 2A and 2B, the non-servicing configuration comprises executing a proxy process service. The proxy process service initiates an update process of application data without performing the set of services. For example, the proxy process service may be configured to refrain from accessing state information, data files, or directory files of the application. By running the proxy service process, the application remains running, but the files that need to be updated are not accessed by other processes of the application.

In accordance with one or more embodiments, the example of operations depicted in FIGS. 2A and 2B provide an update process for an application providing a set of services that allows the application to configure state information, data files, and directory files while the application is running, by executing a proxy service process during the update process.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3A:
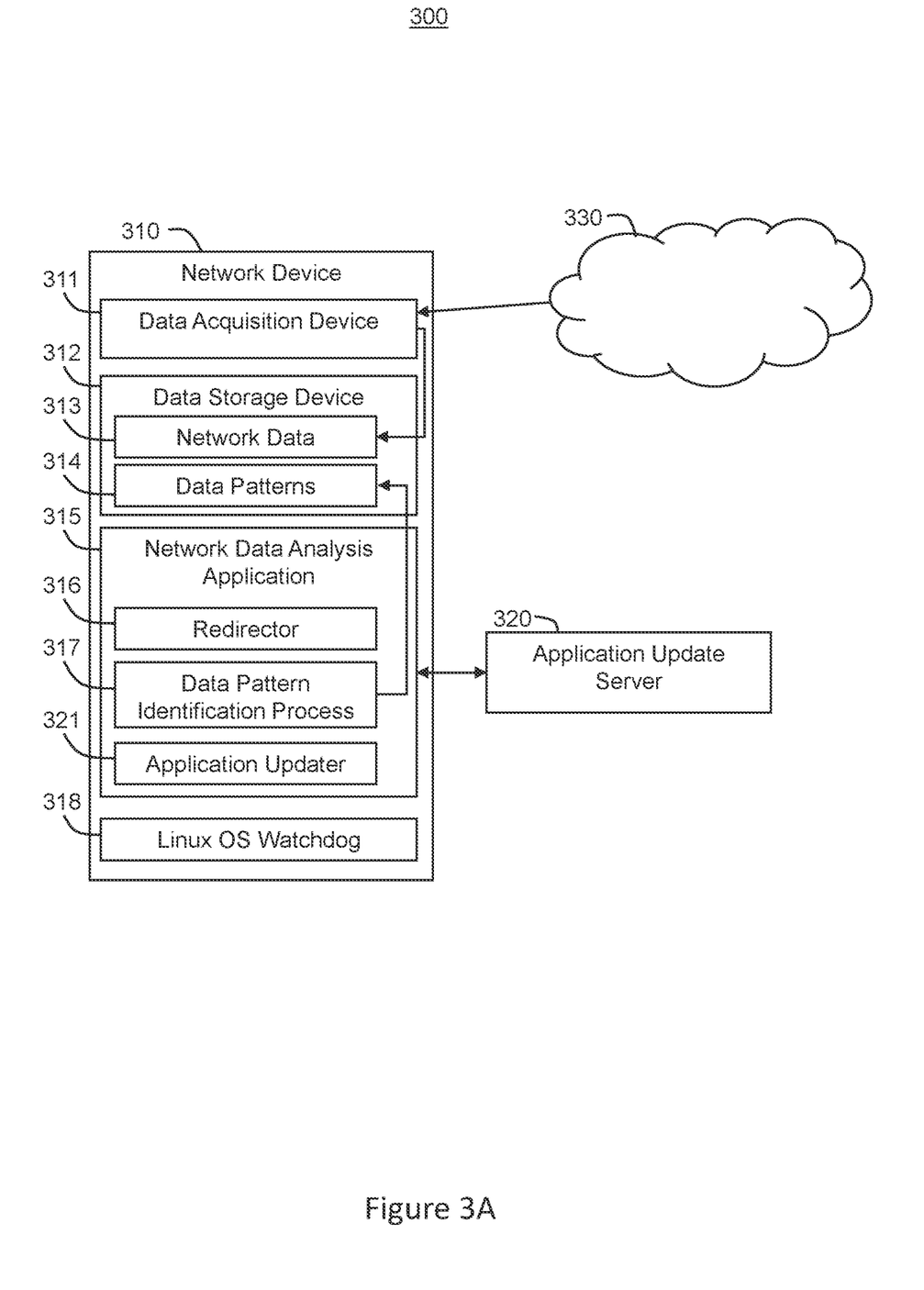
FIGS. 3A-3C illustrate an example embodiment.
Figure 3B:
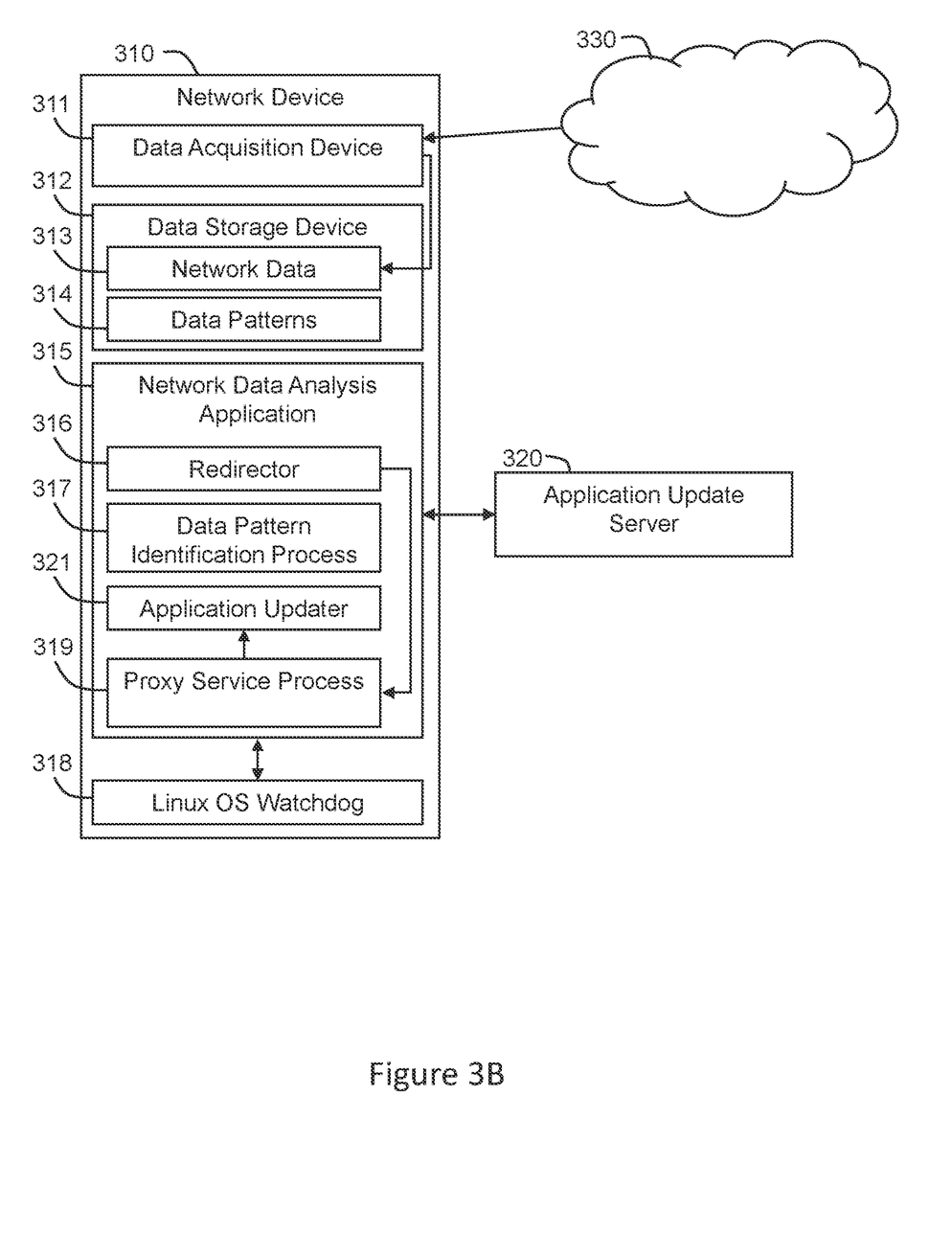
Figure 3C:
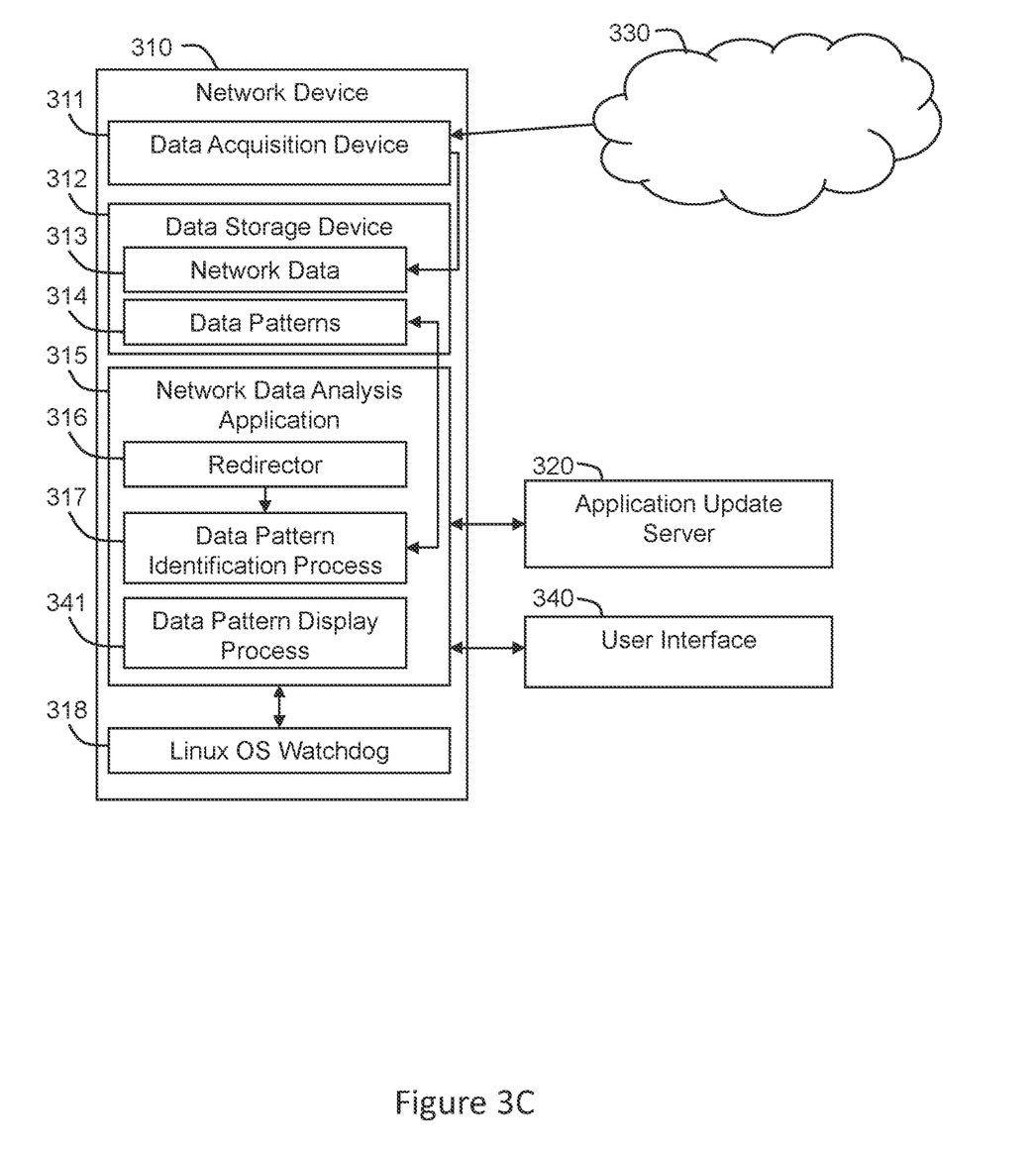

FIGS. 3A to 3C illustrate an example embodiment. A network monitoring system 300 includes a network device 310 and an application update server 320. The network device includes a data acquisition device 311 that obtains network data 313 from a network 330 and stores the network data 313 in a data storage device 312. The network device 310 includes one or more processors to execute a computer program comprising a network data analysis application 315. The network data analysis application 315 includes a redirector 316 and a data pattern identification process 317. The data pattern identification process 317 receives as an input the network data 313 and analyzes the network data 313 to generate data patterns 314, represented in FIG. 3A by an arrow directed from the data pattern identification process 317 to the data patterns 314. The data patterns 314 may include, for example, tables depicting relationships among the data points in the network data 313. The application updater 321 regularly queries the application update server 320 to determine whether an update exists for the network data analysis application 315. Upon determining that an update exists, the application updater 321 downloads the update data. The application updater 321 may store the update data in the data storage device 312. The application updater 321 may further complete preliminary update processes that do not interfere with the data pattern identification process 317. For example, the application updater 321 may create or modify one or more data files or directories, check to ensure particular values are present in one or more files or directories or in state information for the application 315, or any other preliminary processes.

Referring to FIG. 3B, the application updater sets an application launch pointer to point to a proxy service process 319 and shuts down the network data analysis application 315. The Linux™ OS watchdog 318 detects the application shutdown and restarts the application 315. In particular, the watchdog 318 launces the redirector 316. The redirector 316 launches the application from the location indicated by the application launch pointer, which points to the proxy service process 319. The proxy service process 319 initiates the update process by the application updater 321 to update the state information and software associated with the data pattern identification process 317. The proxy service process 319 does not detect data patterns 314. Nor does the data pattern identification process detect data patterns 314 during the update process, as indicated by the lack of an arrow in FIG. 3B. If the Linux™ OS watchdog 318 queries the network data analysis application 315 during the update process, the redirector 316 returns a notification that the application is active, based on the active state of the proxy service process 319. The application updater 321 may determine that the update is complete when any state information, data files, and directory files have been modified according to the update information. The application updater 321 provides a file marker to the proxy service process 319 indicating the update is complete. The proxy application marker sets the application launch pointer to a location associated with the data pattern identification process 317 and shuts down the application 315.

As illustrate in FIG. 3C, the Linux™ OS watchdog 318 determines that the application 315 has shut down and restarts the application 315. In particular, the watchdog 318 launces the redirector 316. The redirector 316 launches the application 315 from the location indicated by the application launch pointer. Since the proxy service process 319 set the pointer to the data pattern identification process 317, the application launches the data pattern identification process 317. In addition, in the embodiment illustrated in FIG. 3C, the update may include additional functionality. The update data includes state information and computer software to convert the data patterns 314 into a visual display via a data pattern display process 341. The visual display data may be output to a user interface 340, for example.

5. Computer Networks and Cloud Networks

In one or more embodiments, the application including the proxy service process is implemented in a computer of a computer network. The computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
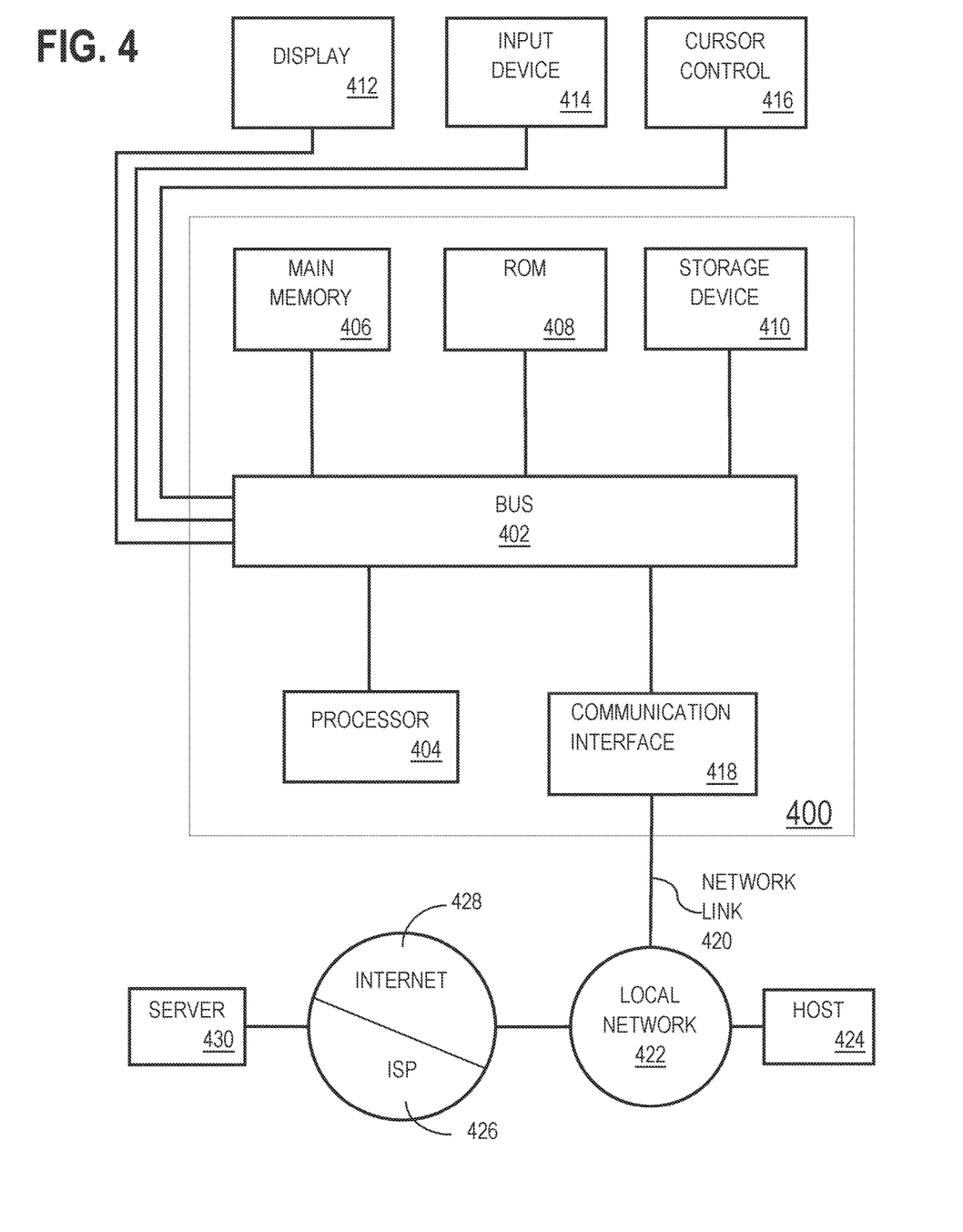
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:

executing a first version of an application configured to provide a set of services via a first application process of the first version of the application, wherein a monitoring service is configured to initiate execution of the application in response to detecting that the application has been terminated;

updating, by the first version of the application, application state information to initiate a second version of the application instead of the first version of the application upon startup of the application by a monitoring service;

terminating execution of the first version of the application;

executing the second version of the application based on the application state information, wherein execution of the second version of the application is initiated by the monitoring service in response to the monitoring service determining that the application has been terminated;

based on the application state information, selecting for execution, by a redirector process of the second version of the application, one of:

(a) a proxy service process, of the second version of the application, that does not provide the set of services; or (b) a second application process, of the second version of the application, that provides the set of services, wherein the redirector selects the proxy service for execution based on the application state information;

causing, by the proxy service, execution of an upgrade process for updating the application state information;

wherein during execution of the upgrade process, the second version of the application continues to execute without providing the set of services, wherein the monitoring service does not restart the application during execution of the upgrade process due to the second version of the application continuing to execute;

subsequent to completion of the upgrade process, selecting for execution, by the redirector process of the second version of the application, the second application process to provide the set of services;

executing the second application process to the provide the set of services.

2. The medium of claim 1, wherein the monitoring service is an operating system watchdog service.

3. The medium of claim 1, wherein updating the application state information includes:
checking an update server for an update package;
retrieving the update package from the update server;
identifying pre-requisite conditions for executing the second version of the application;
based on identifying the prerequisite conditions, performing one or more of:
extracting the update package;
storing state data for the second version of the application;
modifying one or more stage bits.

4. The medium of claim 1, wherein the termination of the first version of application is initiated by the first version of the application.

5. The medium of claim 1, wherein the redirector selects the proxy service based on the application state information comprising data indicating that the upgrade process has not been completed.

6. The medium of claim 1, wherein the upgrade process is external to the second application, and wherein subsequent to initiating the execution of the upgrade process, the second version of the application has no control of the upgrade process.

7. The medium of claim 1, wherein the instructions further cause:
subsequent to the completion of the upgrade process, terminating, by the proxy service process, the second version of the application;
wherein the selecting for execution, by the redirector process of the second version of the application, the second application process is initiated by the monitoring service in response to the monitoring service determining that the application has been terminated.

8. The medium of claim 1, wherein the monitoring process determines that the second version of the application is executing during execution of the upgrade process based on information obtained by the monitoring process from an operating system executing the second version of the application.

9. A method, comprising:
executing a first version of an application configured to provide a set of services via a first application process of the first version of the application, wherein a monitoring service is configured to initiate execution of the application in response to detecting that the application has been terminated;

updating, by the first version of the application, application state information to initiate a second version of the application instead of the first version of the application upon startup of the application by a monitoring service;

terminating execution of the first version of the application;

executing the second version of the application based on the application state information, wherein execution of the second version of the application is initiated by the monitoring service in response to the monitoring service determining that the application has been terminated;

based on the application state information, selecting for execution, by a redirector process of the second version of the application, one of:
(a) a proxy service process, of the second version of the application, that does not provide the set of services; or
(b) a second application process, of the second version of the application, that provides the set of services, wherein the redirector selects the proxy service for execution based on the application state information;

causing, by the proxy service, execution of an upgrade process for updating the application state information;

wherein during execution of the upgrade process, the second version of the application continues to execute without providing the set of services, wherein the monitoring service does not restart the application during execution of the upgrade process due to the second version of the application continuing to execute;

subsequent to completion of the upgrade process, selecting for execution, by the redirector process of the second version of the application, the second application process to provide the set of services;

executing the second application process to the provide the set of services.

10. The method of claim 9, wherein the monitoring service is an operating system watchdog service.

11. The method of claim 9, wherein updating the application state information includes:
checking an update server for an update package;
retrieving the update package from the update server;
identifying pre-requisite conditions for executing the second version of the application;
based on identifying the prerequisite conditions, performing one or more of:
extracting the update package;
storing state data for the second version of the application;
modifying one or more stage bits.

12. The method of claim 9, wherein the termination of the first version of application is initiated by the first version of the application.

13. The method of claim 9, wherein the redirector selects the proxy service based on the application state information comprising data indicating that the upgrade process has not been completed.

14. The method of claim 9, wherein the upgrade process is external to the second application, and wherein subsequent to initiating the execution of the upgrade process, the second version of the application has no control of the upgrade process.

15. The method of claim 9, further comprising:
subsequent to the completion of the upgrade process, terminating, by the proxy service process, the second version of the application;
wherein the selecting for execution, by the redirector process of the second version of the application, the second application process is initiated by the monitoring service in response to the monitoring service determining that the application has been terminated.

16. The method of claim 9, wherein the monitoring process determines that the second version of the application is executing during execution of the upgrade process based on information obtained by the monitoring process from an operating system executing the second version of the application.

17. A system, comprising:
one or more processors; and
memory storing instructions that, when executed by the one or more processors, cause the system to perform:
executing a first version of an application configured to provide a set of services via a first application process of the first version of the application, wherein a monitoring service is configured to initiate execution of the application in response to detecting that the application has been terminated;
updating, by the first version of the application, application state information to initiate a second version of the application instead of the first version of the application upon startup of the application by a monitoring service;
terminating execution of the first version of the application;
executing the second version of the application based on the application state information, wherein execution of the second version of the application is initiated by the monitoring service in response to the monitoring service determining that the application has been terminated;
based on the application state information, selecting for execution, by a redirector process of the second version of the application, one of:
 (a) a proxy service process, of the second version of the application, that does not provide the set of services; or
 (b) a second application process, of the second version of the application, that provides the set of services,
wherein the redirector selects the proxy service for execution based on the application state information;
causing, by the proxy service, execution of an upgrade process for updating the application state information;
wherein during execution of the upgrade process, the second version of the application continues to execute without providing the set of services, wherein the monitoring service does not restart the application during execution of the upgrade process due to the second version of the application continuing to execute;
subsequent to completion of the upgrade process, selecting for execution, by the redirector process of the second version of the application, the second application process to provide the set of services;
executing the second application process to the provide the set of services.

18. The system of claim 17, wherein the monitoring service is an operating system watchdog service.

19. The system of claim 17, wherein updating the application state information includes:
checking an update server for an update package;
retrieving the update package from the update server;
identifying pre-requisite conditions for executing the second version of the application;
based on identifying the prerequisite conditions, performing one or more of:
extracting the update package;
storing state data for the second version of the application;
modifying one or more stage bits.

20. The system of claim 17, wherein the termination of the first version of application is initiated by the first version of the application.

* * * * *

UNITED STATES PATENT AND TRADEMARK OFFICE
CERTIFICATE OF CORRECTION

| | | |
|---|---|---|
| PATENT NO. | : 11,403,093 B1 | Page 1 of 1 |
| APPLICATION NO. | : 17/243050 | |
| DATED | : August 2, 2022 | |
| INVENTOR(S) | : Gandhi et al. | |

It is certified that error appears in the above-identified patent and that said Letters Patent is hereby corrected as shown below:

On the Title Page

Column 1, (72) Inventors:, "Chaitanya Umesh Kulkarni, Wohurn," should read -- Chaitanya Umesh Kulkarni, Woburn --

Signed and Sealed this
Eighteenth Day of June, 2024

Katherine Kelly Vidal
*Director of the United States Patent and Trademark Office*